United States Patent
Warr (12)

(10) Patent No.: US 11,047,700 B2
(45) Date of Patent: Jun. 29, 2021

(54) NAVIGATION AND ROUTING BASED ON IMAGE DATA (71) Applicant: Uber Technologies, Inc., San Francisco, CA (US)

(72) Inventor: Andrew Martin Warr, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 233 days.

(21) Appl. No.: 16/265,026

(22) Filed: Feb. 1, 2019

(65) Prior Publication Data

US 2020/0249042 A1   Aug. 6, 2020

(51) Int. Cl.
  *G01C 21/36* (2006.01)
  *G06K 9/00* (2006.01)
  *H04W 4/40* (2018.01)
  *G06Q 50/30* (2012.01)
  *G01C 21/34* (2006.01)

(52) U.S. Cl.
  CPC ..... *G01C 21/3602* (2013.01); *G01C 21/3438* (2013.01); *G01C 21/3697* (2013.01); *G06K 9/00838* (2013.01); *G06Q 50/30* (2013.01); *H04W 4/40* (2018.02)

(58) Field of Classification Search
  CPC ............ G01C 21/3602; G01C 21/3438; G01C 21/3697; H04W 4/40; G06K 9/00838; G06Q 50/30
  See application file for complete search history.

(56) References Cited

U.S. PATENT DOCUMENTS

| 5,557,522 | A  | 9/1996  | Nakayama |
| 5,948,040 | A  | 9/1999  | DeLorme  |
| 6,058,339 | A  | 5/2000  | Takiguchi |
| 6,233,517 | B1 | 5/2001  | Froeberg |
| 6,321,158 | B1 | 11/2001 | DeLorme  |
| 7,263,437 | B2 | 8/2007  | Hirose   |

(Continued)

FOREIGN PATENT DOCUMENTS

| CN | 104575072 | 4/2015 |
| CN | 104931063 | 9/2015 |

(Continued)

OTHER PUBLICATIONS

Pelzer, et al., "A Partition-Based Match Making Algorithm for Dynamic Ridesharing", IEEE Transactions on Intelligent Transportation Systems, vol. 16, Issue: 5, pp. 2587-2596 (2015).

(Continued)

*Primary Examiner* — Calvin Cheung
(74) *Attorney, Agent, or Firm* — Mahamedi IP Law LLP (57) ABSTRACT

A computing system can receive image data corresponding to an image of a passenger interior of the vehicle from a computing device of a vehicle or a driver. Using the image data, the computing system can determine at least one of (i) a first route for the vehicle or the driver to travel to a start location of a requesting user, or (ii) a second route for the requesting user to travel to the start location. The computing system may then transmit at least one of (i) navigation instructions based on the first route to the computing device of the vehicle or the driver, or (ii) navigation instructions based on the second route to a computing device of the requesting user.

18 Claims, 5 Drawing Sheets

(56) References Cited

U.S. PATENT DOCUMENTS

| | | |
|---|---|---|
| 7,822,426 B1 | 10/2010 | Wuersch |
| 8,005,488 B2 | 8/2011 | Staffaroni |
| 8,565,789 B2 | 10/2013 | Staffaroni |
| 9,075,136 B1 | 7/2015 | Joao |
| 9,158,414 B1 | 10/2015 | Gluzberg |
| 9,452,785 B2 | 9/2016 | Racah |
| 9,547,307 B1 | 1/2017 | Cullinane |
| 9,562,785 B1 | 2/2017 | Racah |
| 9,599,477 B1 | 3/2017 | Aula |
| 9,613,386 B1 | 4/2017 | Arden |
| 9,631,933 B1 | 4/2017 | Aula |
| 9,715,233 B1 | 6/2017 | Mandeville-Clark |
| 9,702,714 B2 | 7/2017 | Botea |
| 9,733,096 B2 | 8/2017 | Colijn |
| 2004/0249818 A1 | 12/2004 | Isaac |
| 2006/0235739 A1 | 10/2006 | Levis |
| 2007/0150375 A1 | 6/2007 | Yang |
| 2007/0233373 A1 | 10/2007 | Choi |
| 2008/0275645 A1 | 11/2008 | Hoshino |
| 2008/0277183 A1 | 11/2008 | Huang |
| 2009/0156241 A1 | 6/2009 | Staffaroni |
| 2009/0216600 A1 | 8/2009 | Hill |
| 2009/0326991 A1 | 12/2009 | Wei |
| 2011/0320232 A1 | 12/2011 | Staffaroni |
| 2012/0004840 A1 | 1/2012 | Lee |
| 2012/0130627 A1 | 5/2012 | Islam |
| 2013/0073327 A1 | 3/2013 | Edelberg |
| 2013/0132140 A1 | 5/2013 | Amin |
| 2013/0132246 A1 | 5/2013 | Amin |
| 2014/0011522 A1 | 1/2014 | Lin |
| 2014/0129135 A1 | 5/2014 | Holden |
| 2014/0365250 A1 | 12/2014 | Ikeda |
| 2015/0006072 A1 | 1/2015 | Goldberg |
| 2015/0067878 A1 | 3/2015 | Steelberg |
| 2015/0081362 A1 | 3/2015 | Chadwick |
| 2015/0143275 A1 | 5/2015 | Lee |
| 2015/0161564 A1 | 6/2015 | Sweeney |
| 2015/0219464 A1 | 8/2015 | Beaurepaire |
| 2015/0228192 A1 | 8/2015 | Kawamoto |
| 2015/0248689 A1 | 9/2015 | Paul |
| 2015/0254581 A1 | 9/2015 | Brahme |
| 2015/0278618 A1* | 10/2015 | Nuscheler ............... B64D 47/08 382/104 |
| 2015/0302342 A1 | 10/2015 | Yeh |
| 2015/0339923 A1 | 11/2015 | TomTom |
| 2015/0339928 A1 | 11/2015 | Ramanujam |
| 2016/0027306 A1 | 1/2016 | Lambert |
| 2016/0027307 A1* | 1/2016 | Abhyanker ............ G06Q 50/01 701/117 |
| 2016/0034828 A1 | 2/2016 | Sarawgi |
| 2016/0034845 A1 | 2/2016 | Hiyama |
| 2016/0042303 A1* | 2/2016 | Medina ................. H04W 4/024 705/5 |
| 2016/0048804 A1 | 2/2016 | Paul |
| 2016/0055769 A1 | 2/2016 | Angelescu |
| 2016/0071411 A1 | 3/2016 | Stenneth |
| 2016/0301698 A1 | 10/2016 | Katara |
| 2016/0320195 A1 | 11/2016 | Liu |
| 2016/0320198 A1 | 11/2016 | Liu |
| 2016/0321771 A1 | 11/2016 | Liu |
| 2016/0370194 A1 | 12/2016 | Colijn |
| 2017/0052034 A1 | 2/2017 | Magazinik |
| 2017/0059347 A1 | 3/2017 | Flier |
| 2017/0103490 A1 | 4/2017 | Haparnas |
| 2017/0153714 A1 | 6/2017 | Gao |
| 2017/0160092 A1 | 6/2017 | Botea |
| 2017/0169366 A1 | 6/2017 | Klein |
| 2017/0169535 A1 | 6/2017 | Tolkin |
| 2017/0193404 A1 | 7/2017 | Yoo |
| 2017/0213308 A1 | 7/2017 | Wellborn |
| 2017/0277191 A1 | 9/2017 | Fairfield |
| 2017/0286884 A1 | 10/2017 | Shoval |
| 2017/0293950 A1 | 10/2017 | Rathod |
| 2017/0300848 A1 | 10/2017 | Shoval |
| 2017/0309171 A1 | 10/2017 | Zhao |
| 2017/0314948 A1 | 11/2017 | Racah |
| 2017/0337810 A1 | 11/2017 | Abe |
| 2017/0365030 A1 | 12/2017 | Shoham |
| 2018/0156623 A1 | 6/2018 | West |
| 2018/0158325 A1 | 6/2018 | Bernhardt |
| 2018/0202820 A1 | 7/2018 | Yu |
| 2018/0202821 A1 | 7/2018 | Yu |
| 2018/0342035 A1 | 11/2018 | Sweeney |
| 2018/0356239 A1* | 12/2018 | Marco ................... G06Q 50/30 |
| 2018/0374032 A1 | 12/2018 | Pan |
| 2019/0137288 A1 | 5/2019 | Rahematpura |
| 2019/0306258 A1 | 10/2019 | Yamashita |
| 2020/0160709 A1* | 5/2020 | Ramot ................. G06Q 10/109 |

FOREIGN PATENT DOCUMENTS

| | | |
|---|---|---|
| JP | 2010-208195 | 8/1998 |
| JP | 3934985 | 6/2007 |
| JP | 2012-73995 | 4/2012 |
| JP | 2004-073639 | 5/2015 |
| WO | WO 2002006994 | 1/2002 |
| WO | WO 2014074407 | 5/2014 |
| WO | WO-2014106617 | 7/2014 |

OTHER PUBLICATIONS

Office Action in EP 15830335.4 dated Nov. 21, 2019.
First Office Action in CN 201580043970 dated Apr. 22, 2020.
Pre-Examination Office Action in BR 112017002174-9 dated May 6, 2020.
International Search Report in PCT/US2015/043654 dated Nov. 26, 2015.
IPRP in PCT/US2015/043654 dated Feb. 16, 2017.
International Search Report in PCT/US2016/066030 dated Feb. 28, 2017.
Written Opinion in SG 11201700671P dated Oct. 13, 2017.
EESR in EP 15830335.4 dated Nov. 29, 2017.
IPRP in PCT/US2016/066030 dated Jun. 21, 2018.
2nd Written Opinion in SG 11201700671P dated Aug. 29, 2018.
ESER in EP 16874019.9 dated Aug. 22, 2018.
ISR and Written Opinion in PCT/US2018/013583 dated Apr. 20, 2018.
ISR and Written Opinion in PCT/US2018/059230 dated Jan. 2, 2019.
Andrew J. Hawkins, Lyft is now suggesting more convenient pickup locations, because a little walking won't kill you. Jun. 26, 2017 The Verge (www.theverge.com).
Office Action in EP 15830335.4 dated Mar. 21, 2019.
Office Action in JP 2017-505856 dated Feb. 6, 2019.
Mark H. Walker, "Microsoft Office Visio 2003 Official Manual", Initial Pressing, Nikkei BP Soft Press, Apr. 4, 2005, First Edition, pp. 423-425.
ISR dated Oct. 3, 2018 in PCT/US2018/039830.
Pre-Exam Office Action in BR 112018011694-7 dated Jul. 13, 2020.
Borison, Rebecca, "Uber Brings its SUV Fleet to NYC", Jul. 30, 2014, Business Insider, p. 1.
Hilen, Brittany, Uber and Google bring WIFI to cars in Philadelphia, Slashgear, dated Jul. 24, 2014, p. 1, https://web.archive.org/web/20140724201314/http://www.slashgear.com/uber-and-google-bring-wifi-to-cars-in-philadelphia-22338326.
Jain, "Contextual Adaptive User Interface for Android Devices", Annual IEEE India Conference (INDICON), IEEE, pp. 1-4 (2013).
IPRP in PCT/US2019/039830 dated Jun. 26, 2019.
Examination Report No. 1 for AU 2015301178 dated Jun. 11, 2020.
Office Action in EP 16874019.9 dated Jun. 9, 2020.

* cited by examiner

NAVIGATION AND ROUTING BASED ON IMAGE DATA

BACKGROUND

Network-based, on-demand transportation services can match requesting users with available drivers. For example, based on the location of a requesting user, a network computing system that coordinates the on-demand transportation services can select a proximate driver, from a pool of candidate drivers, based on the distance or estimated time of arrival of the proximate driver to a rendezvous location.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Hazards during passenger pick-up for transport services involve passengers jaywalking, entering the vehicle on the traffic side as opposed to curbside, walking across busy intersections, and the like. A network computing system described herein can coordinate on-demand transportation between users and drivers throughout a transport service region. In various embodiments, the network computing system can receive transport requests from a user base via a designated service application executing on the computing devices of those users (e.g., smartphones or tablet computers). Based on the relative locations of the users and drivers, and/or estimated arrival times of both the users and drivers, the network computing system can match a given transport request with a driver and thereafter coordinate a rendezvous and pick-up.

According to examples described herein, the computing system can further receive transport requests from user computing devices of requesting users of an on-demand carpool or rideshare service. In various examples, the computing system can receive, over one or more networks, data representing an image from a computing device of a vehicle or a driver. The image data can comprise at least a portion of a passenger interior of the vehicle. Using the image data, the computing system can determine at least one of (i) a first route for the vehicle or the driver to travel to a pick-up location of a requesting user, or (ii) a second route for the requesting user to travel to the pick-up location, and transmit, over the one or more networks, at least one of (i) navigation instructions based on the first route to the computing device of the vehicle or the driver, or (ii) navigation instructions based on the second route to a computing device of the requesting user.

In certain implementations, a transport service application can be launched or otherwise executed on a computing device of a driver. The transport service application can be utilized to trigger imaging capturing functions of the passenger interior of the driver's vehicle at specified triggering events. As provided herein, the transport service application can utilize local processing resources of the computing device on which it is executing (e.g., the driver's smartphone), and/or the processing resources of a remote computing system connected to the driver's or vehicle's computing device over one or more networks. For example, the remote computing system can comprise a datacenter operable to coordinate and manage on-demand transportation throughout a given region (e.g., a metropolitan area). In one example, the initial launch of the transport service application can trigger a camera of the driver's computing device to capture an image. Additionally or alternatively, a driver selection or designation of a particular mode or state (e.g., an on-duty or availability mode) can trigger the camera to capture an image. Still further, in some examples, the camera can be initiated to capture an image based on a set of programmatic rules. For example, if the driver initiates an on-duty or availability mode, and/or subsequently initiates a carpool service mode (e.g., accepts a trip request for one or more riders) on the application, the application can also trigger the camera to capture an image (e.g., also referred to herein as image capture triggers).

Once the image capture triggers are initiated, the application itself, and/or the remote computing system communicating with the application, can monitor for transport service events that trigger the computing device of the driver or a computing device of the vehicle to capture one or more images of the passenger interior of the vehicle. For example, the computing device of the driver or vehicle can be coupled to a cradle, holder, or device mount fixed or mounted in one of a plurality of positions (e.g., on a center portion of the windshield or a driver side portion of the windshield at varying heights, inserted in an air vent, or on a dashboard). According to an embodiment, the transport service application can trigger the computing device of the driver or the vehicle to capture an initial image in order to calibrate its local coordinate or object position system in relation to each passenger seat of the vehicle.

In various examples, the transport service application can detect a set of interior features (e.g., seat headrests) to determine the field of view of the camera and/or whether any of the seats of the passenger interior are blocked from the field of view. At this particular stage, the transport service application can determine that no passengers are currently seated in the vehicle as an initial calibration, and then subsequently track the number of passengers and locations or seating positions of those passengers within the vehicle at any given time. For example, the transport service application can identify seat locations and perform a facial detection operation to identify if any passengers are present, or can calculate a probability that one or more blocked seats are not occupied. If the probability meets a given threshold (e.g., 70%) then the application can determine that the no passengers are currently seated within the vehicle. Included in this tracking process, the transport service application can perform a binary determination for any seat that is blocked from the field of view of the camera based on the image data. If only one seat is blocked, the application can determine whether that seat is occupied or unoccupied based on the current number of passengers within the vehicle and a number of passengers within the field of view. If multiple seats are blocked, then the application can execute a set of processes using one or more sensors of the driver's computing device, the vehicle, and/or the computing devices of the passengers, as described herein.

According to examples provided herein, the image capture triggers can include mode selection triggers inputted by the driver or executed by the vehicle (e.g., for autonomous vehicle implementations), or triggers determined by the network service or system based on driver or trip state(s). The mode selection triggers can correspond to inputs on a user interface of the transport service application. For example, the driver an input one or more selectable buttons or features at each stage of a transport service session. These selectable features can correspond to passenger pick-up or rendezvous events and passenger drop-off events, and the driver can select one or the other depending on the event. As provided herein, each selection of the pick-up feature and drop-off feature on the user interface can trigger the camera to capture an image, multiple images, or a video clip of the passenger interior.

In various examples, after each triggered event, the computing device of the driver or vehicle can transmit image data corresponding to the captured image(s) to the remote computing system, which can utilize the image data for navigation and/or seating arrangement purposes. Specifically, the computing system can execute an edge detection or facial detection technique on the image data to identify the positions of passengers within the vehicle, and can configure the route of the vehicle such that an upcoming passenger is picked with a curbside seat of the vehicle available or unoccupied. As described herein, a curbside seat can refer to a seat that is closer to the curb or side of the street that the passenger will enter the vehicle in (e.g., so that the passenger does not have to move to the other side of the vehicle and enter from the other, further side). Additionally or alternatively, the computing system can configure a route of the upcoming passenger (e.g., walking directions) to the pick-up location such that a curbside seat is available when the vehicle arrives at the pick-up location. Further still, the computing system can configure or otherwise change the pick-up location in order to ensure that the upcoming passenger is picked up with a curbside seat available.

In addition, the computing system can configure the vehicle's route such that a next passenger drop-off occurs with the passenger's seat being curbside. For example, the computing system can analyze the image data to determine a current seating arrangement of the passengers within the vehicle, identify a next passenger drop-off location (e.g., a home or work address), and configure navigation instructions for the driver or vehicle such that the seat of the next passenger is curbside at the next drop off location. As such, the remote computing system can configure the routes of the driver and/or upcoming passenger, and provide navigation instructions based on the images captured by the computing device of the driver or vehicle. In certain implementations, the navigations instructions can be transmitted to the computing devices of the driver and upcoming passenger through the respective transport applications through which a carpool ride request was transmitted (e.g., for the passenger) and a transport invitation was accepted (e.g., for the driver).

In various examples, the computing system can track the positions of the passengers within the vehicles using the triggered images captured by the computing device of the driver. In doing so, the computing system can further assign seats within the vehicle to upcoming passengers based on the available seats within the vehicle and the routes configured for the vehicle and the upcoming passenger. In such examples, the computing system can provide a user interface element indicating the assigned seat through the rider application executing on the computing device of the upcoming passenger. For example, this user interface element can provide a top-view visualization of the vehicle's interior and highlight the assigned seat for the upcoming passenger. Accordingly, when the vehicle arrives at the pick-up location, the upcoming passenger will know exactly which seat to access and occupy.

In some aspects, the triggering events can cause the computing device of the driver and/or the computing device(s) of the passenger(s) to capture additional data, such as audio data to perform audio localization of the passengers, emit ultrasonic beacons, perform wireless signal detection and positioning, and the like. For example, when multiple seats are blocked from the field of view of the camera, additional sensors can be utilized to determine whether each of those seats are occupied at any given time. In one example, the driver's computing device records data of the pick-up event or drop-off event to determine which door of the vehicle is opened. Based on the event (e.g., pick-up or drop-off) and the opened door, the computing system can determine that a corresponding seat—blocked from the field of view—is occupied or unoccupied. In additional implementations, the computing system can receive positioning data (e.g., GPS data) from the computing devices of the current passengers to determine the relative positions of those passengers within the vehicle at any given time. For example, the GPS data offset between two computing devices of two passengers can indicate which side of the vehicle and/or which row of the vehicle the passengers are seated.

Examples described herein achieve a technical effect of more seamlessly coordinating pick-ups and drop-off of carpool or rideshare passengers using the sensor resources of the computing device(s) of the driver, vehicle, and/or passengers. By configuring the image capturing triggers described herein, and utilizing image data from the computing device of the driver or vehicle, the techniques performed by the disclosed computing system provide a technical solution to current problems experienced in the field of remotely coordinated carpool transport services. The technical solutions described herein provide added safety in pick-up and drop-offs by ensuring curbside pick-ups and drop-offs (e.g., preventing the passengers from having to exit on the street-side and/or rush across traffic), and reduce pick-up and drop-off times.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Some examples are referenced herein in context of an autonomous vehicle (AV) or self-driving vehicle (SDV). An AV or SDV refers to any vehicle which is operated in a state of automation with respect to steering, propulsion, and braking. Different levels of autonomy may exist with respect to AVs. For example, some vehicles may enable automation in limited scenarios, such as on highways, provided that drivers are present in the vehicle. More advanced AVs can drive without any human assistance from within or external to the vehicle. Such vehicles are often required to make advanced determinations regarding how the vehicle behaves given challenging surroundings of the vehicle environment.

System Description

Figure 1:
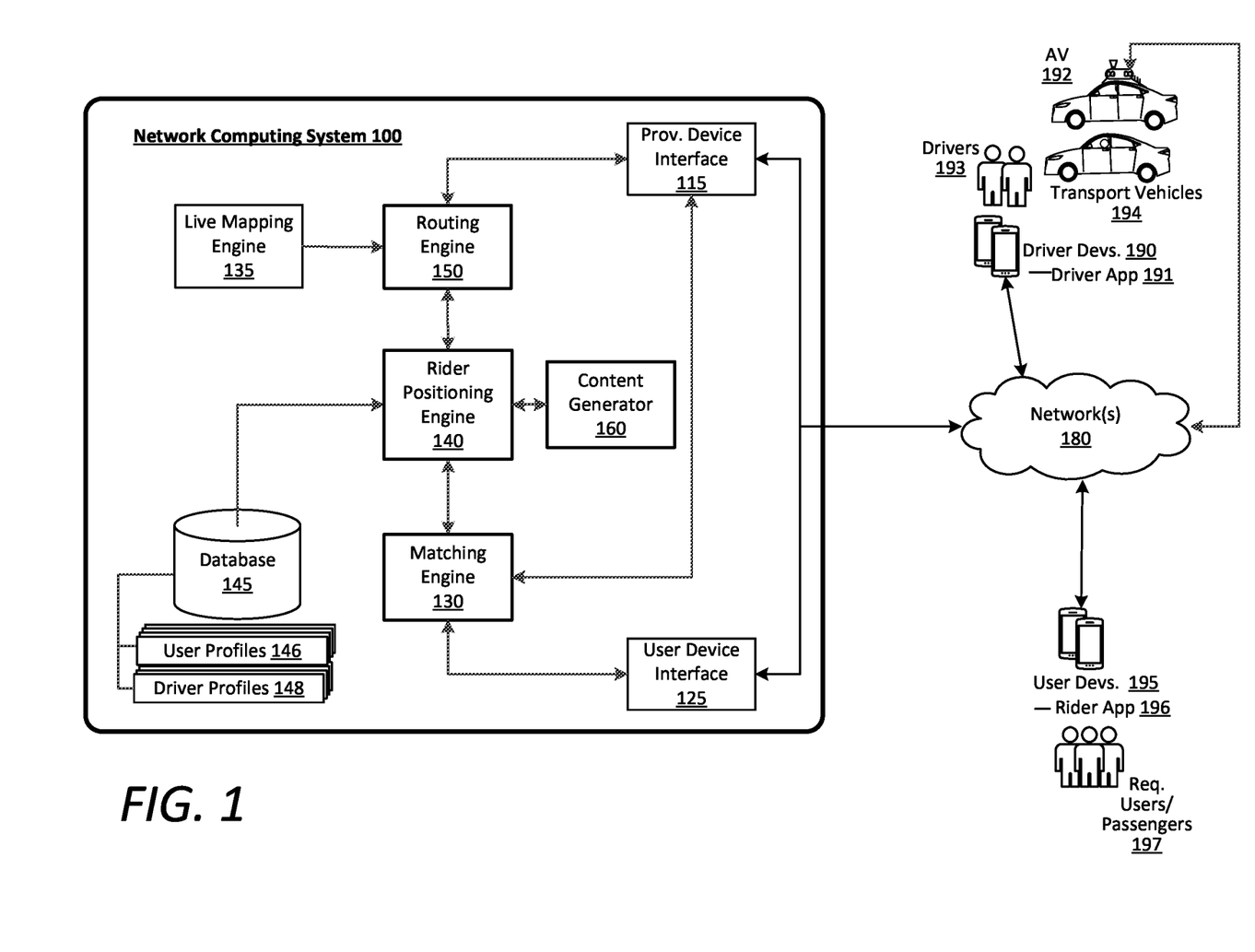
FIG. 1 is a block diagram illustrating an example computing system in communication with users and drivers, in accordance with examples described herein.

FIG. 1 is a block diagram illustrating an example network computing system in communication with computing devices of requesting users and drivers, in accordance with examples described herein. In various examples, the network computing system 100 can include a user device interface 125 that connects with the user devices 195 of the requesting users 197 over one or more networks 180. The network computing system 100 can further include a provider device interface 115 that connects with driver devices 190 over one or more networks 180. As described herein, the driver devices 190 and user devices 195 can comprise computing devices, such as smartphones, tablet computers, or other mobile computing devices.

According to some examples, transport vehicles 194 that provide on-demand transport services for the region can include human driven vehicles operated by drivers 193, and can also include autonomous vehicles (AVs) 192 that can be readily directed by the network computing system 100 to service transport requests from requesting users 197. For example, a matching engine 130 of the network computing system 100 can match a transport request from a user 197 with an AV 192 (e.g., based on the AV 192 being proximate to the user 197) and transmit a transport directive that causes the AV 192 to reroute and rendezvous with the user 197. Accordingly, the network computing system 100 can coordinate pick-ups and drop-offs of users, packages, comestible goods, and other freight between requesting users 197 and a pool of available transport vehicles 194, which can comprise vehicles operated by human drivers 193 as well as AVs 192.

In certain implementations, each driver 193 within a given transport service region can execute a driver application 191 on the driver device 190 to initiate an on-duty or available status. Further, the requesting users 197 can execute a rider application 196 on their respective user devices 195 to configure an on-demand transport request (e.g., for user transport, food delivery, freight or package delivery, etc.). In some aspects, the user 197 can configure a specified destination and/or a specific or suggested pick-up location to rendezvous with a matched driver 193 and vehicle 194.

According to examples described herein, the network computing system 100 can include a matching engine 130, which can receive the transport requests from the user devices 195 of the requesting users 197. In various examples, the matching engine 130 can further receive location data from the driver devices 190 indicating the dynamic locations of the drivers 193 operating throughout the transport service region. In certain aspects, the network computing system 100 can further include a mapping engine 135 that generates map data, enabling the matching engine 130 to identify the respective locations of the drivers 193 based on orientation, direction of travel, available routes, and estimated times of arrival to a rendezvous location with the requesting user 197. Based on an estimated distance or time to the rendezvous location, the matching engine 130 can select a particular driver 193 to rendezvous with the requesting user 197 to service the transport request.

In certain implementations, the matching engine 130 can access a user profile 146 of the requesting user 197 stored in a local database 145 to, for example, determine user preferences, such as a preferred vehicle type, transport service type, a preferred pick-up location (e.g., within a certain proximity of the user's current location), and the like. In various aspects, the matching engine 130 can further access driver profiles 148 of a candidate set of drivers 193 (e.g., operating within a certain distance or time from the user's current location), and filter the candidate set based on the user's inputted or determined preferences (e.g., a luxury vehicle service). Accordingly, the matching engine 130 can select a matching driver from the filtered set of candidate drivers 193 to service a given transport request.

According to examples described herein, the network computing system 100 can include a rider positioning engine 140 that can track the positions of riders 197 within the transport vehicles 194 as the vehicles 194 operate throughout the transport service region. In certain implementations, the rider positioning engine 140 can receive sensor data from the transport vehicle 194 (e.g., an interior camera or seat sensor), the computing device 190 of the driver 193, and/or the computing device 195 of the requesting user 197 to identify a position of passengers within the vehicle 194. As the matching engine 130 matches the driver 193 with sequential carpool passengers 197, the rider positioning engine 140 can track the positions of current occupants within the vehicle 194, and output the positions to a routing engine 150. In certain aspects, the rider positioning engine 140 can further track empty seats within the vehicle 194.

According to examples provided herein, the provider interface 115 can receive image data corresponding to an image or multiple images from the driver device 190, which can comprise at least a portion of the passenger interior of the driver's vehicle 194. When the transport vehicle is an AV 192, the provider interface 115 can receive image data corresponding to images of the passenger interior of the AV 192 directly. As described herein, the image data can be transmitted based on a set of triggering conditions. For example, image data corresponding to an image can be received by the computing system 100 when the driver 193 or AV 192 inputs an on-duty or available status. Based on this initial image, the rider positioning engine 140 can determine whether any seats of the vehicle are blocked from the field of view of the computing device 190 (e.g., by detecting headrests within the vehicle). If so, the rider positioning engine 140 can track whether the blocked seat is occupied based on the number of passengers 197 currently in the vehicle, and if needed, request additional sensor data from the driver device 190 or the user device(s) 195 of the passenger(s) 197.

Thereafter, the rider positioning engine 140 or the driver application 191 can trigger the driver device 190 to capture updated images of the passenger interior of the vehicle 194. These triggers can correspond to each time the driver 193 inputs an update into the service application, such as a passenger pick-up or a passenger drop off. Additionally, the triggers can correspond to inertial measurement unit (IMU) data or positioning data from the driver device 190 indicating that the vehicle 194 has stopped at a particular point of interest (e.g., a pick-up location or drop-off location). The rider positioning engine 140 can utilize the updated image(s) to determine the seating arrangement of occupying passengers, and based on the current seating arrangement, the routing engine 150 can configure the route for the vehicle 194 to a next pick-up location or drop-off location. In further examples, the routing engine 150 can configure a route for an upcoming passenger (e.g., walking directions) such that when the vehicle arrives, an unoccupied curbside seat is available for the user 197.

When one or more seats within the vehicle are blocked from the field of view of the camera of the driver device 190, the rider positioning engine 140 can dynamically infer whether each of the blocked seats are occupied. For example, after the initial calibration based on the initial image, the rider positioning engine 140 can determine the mounting position of the driver's computing device 190. Thereafter, each pick-up and drop-off, as well as each updated image, can provide the rider positioning engine 140 with the necessary data to determine, at any given time, whether each blocked seat is occupied. In one example, the matching engine 130 can provide the rider positioning engine 140 with information corresponding to a number of upcoming passengers at a next carpool pick-up location. When image data corresponding to an updated image is received from the driver device 190 (e.g., after the pick-up), the rider positioning engine 140 can identify any new occupants in visible seats, and then infer whether one or more blocked seats as occupied.

In certain implementations, the rider positioning engine 140 can receive additional sensor data from the user devices 195 of the passengers 197. In certain examples, the sensor data from the user computing devices 192 can comprise inertial measurement unit (IMU) data from integrated IMUs of the computing devices 195, BLUETOOTH localization data that describes the relative positions of each passenger 197—and in certain aspects, the driver 193—in relation to each other. In some variations, the sensor data can include positioning system data (e.g., GPS location pings), Wi-Fi or other wireless signal data, and the like. In one aspect, the rider positioning engine 140 can be triggered to monitor IMU data from the user device 195 when the user enters the vehicle 194, and based on the data signatures (e.g., accelerometer and gyroscopic sensor data) from the IMU of the user device 195, track the passenger's movement within the vehicle 194 to determine which seat the passenger 197 occupies at any given time.

In certain implementations, the sensor data can be remotely accessed by the rider positioning engine 140 via the designated rider application 196 executing on the computing devices 195 of the carpool passengers 197. The computing devices 195 can comprise mobile computing devices, such as smartphones or tablets. In various examples, the rider positioning engine 140 can receive the sensor data directly from the passengers' computing devices 195 within the vehicle, and/or via the computing device 190 of the driver 193.

In certain examples, the driver's computing device 190 can execute a designated driver application 191 that causes the device 190 or enables the remote computing system 100 to determine the relative locations of the passengers 197 within the vehicle 194. In some aspects, the computing device 190 of the driver 193 (e.g., the driver's mobile computing device) can do so by capturing image data of the passenger interior of the vehicle 194, audio data to perform audio localization of the passengers 197, ultrasonic beacons, wireless signal detection and positioning, and the like. Based on the locations of the passengers 197 within the vehicle 194, the rider positioning engine 140 can assign seats and/or the routing engine 150 can optimize routing for pick-up as described herein.

For autonomous vehicle 192 implementations, the rider positioning engine 140 can receive sensor data from various sensor resources of the autonomous vehicle 192, such as seat sensors or an interior camera, to determine the positions of the passengers 197 within the vehicle 192. In additional implementations, the autonomous vehicle 192 can utilize its external sensors, such as cameras and/or LIDAR sensors to evaluate or determine the positions of passengers within the vehicle 192. For example, the autonomous vehicle 192 can identify which door a passenger uses when entering and exiting the vehicle 192 to aid in determining the current seating arrangement of passengers within the vehicle 192 at any given time. Additionally or alternatively, the computing system 100 can access or otherwise receive sensor data from the vehicle's external sensors to determine the manner in which passengers of the autonomous vehicle 192 entering and exiting the vehicle 192 to, for example, confirm or determine the seating arrangement.

Output from the rider positioning engine 140 can be received by the routing engine 150, which can transmit route data to the provider device 190 of the driver 193, or an on-board computing system of the AV 192, to optimize a next carpool passenger pick-up. The output can comprise the seating positions of the current carpool passengers within the vehicle and/or the current empty seat(s) within the vehicle. The routing engine 150 can further receive match data from the matching engine 130 to determine the location of a next carpool pickup or drop-off. The routing engine 150 can transmit route data to the driver device 190 of the driver 193 such that the transport vehicle 194 picks up or drops off the carpool passenger 197 on the curbside of the vehicle 194 to prevent entry into and exiting from the vehicle 194 on the street side.

For example, the routing engine 150 can transmit route data to the provider device 190 of the driver 193 (e.g., via the executing driver application 191) that will cause the transport vehicle 194 to arrive at the pickup location such that an empty seat of the vehicle is curbside adjacent to the upcoming passenger 197. For one-way roads, the driver 193 can operate the vehicle 194 to ensure that the upcoming passenger 197 is picked up from the curbside so as to avoid forcing the upcoming passenger 197 to cross the road. For two-way roads, the routing engine 150 can route the driver 193 in a manner that causes the transport vehicle 194 to arrive at the pickup location such that the upcoming passenger can enter the vehicle 194 from the curbside and with an empty seat adjacent to the upcoming passenger available. At times, this may involve the vehicle 194 being routed such that the overall ETA and route length are slightly increased.

In some aspects, the determination of whether the driver 193 or the upcoming passenger 197 is to change the route or pick-up location respectively, can be at least partially dependent upon a safety factor for all parties. In such examples, safety can comprise a factor contributing to a convenience threshold. For example, the user profile 146 of the upcoming rider 197 may indicate a history of that rider 197 not opting to walk (e.g., for physical/disability reasons). As another example, a rendezvous intersection at which the driver 193 is to meet the upcoming rider 193 may be currently busy or have a dangerous history (e.g., a history of traffic accidents). In other examples, a driver 193 on a one-way street may have to cross several lanes in a short amount of time to arrive at the pick-up locations.

Accordingly, based on image data corresponding to an image of the passenger interior of the vehicle 194, the routing engine 150 can configure the route of the driver 193 and/or the walking directions for the upcoming passenger 197 to ensure a curbside pickup and an available empty seat adjacent to the curb. For example, after a drop-off, the driver device 190 can be triggered to capture an updated image. The rider positioning engine 140 can analyze image data corresponding to the image to identify one or more empty seats within the vehicle 194. The routing engine 150 can configure the route and navigation instructions for the vehicle 194 and/or the upcoming passenger 197, and/or alter the pick-up location, as described herein.

It is contemplated that a curbside empty seat within the transport vehicle may not be readily available in all scenarios, which may result in deficiencies in the coordination between the matching engine 130, the rider positioning engine 140, and the routing engine 160. According to various examples, the network computing system 100 can further include a content generator 160 that can coordinate with the rider positioning engine 140 and routing engine 150 to reconfigure the current passengers within the transport vehicle 194 to ensure that an empty seat is curbside for an upcoming pickup. In such examples, the network computing system 100 can operate according to a priority hierarchy for any given upcoming pickup.

In certain examples, a received carpool transport request may require more than one seat for multiple passengers. In such examples, the matching engine 130 can filter out candidate drivers 193 that currently do not have enough empty seats to fulfill the request. Furthermore, the rider positioning engine 140 can coordinate with the content generator 160 to reposition the current passenger(s) within the vehicle such that the upcoming passengers 197 sit proximate or adjacent to each other.

The priority hierarchy can comprise an initial priority that the transport vehicle 194 be matched with upcoming passengers 197 such that a curbside empty seat is available within the vehicle 194 given the pick-up location. In certain implementations, if a curbside empty seat is unavailable, the content generator 160 may transmit a suggested pick-up location update to the user device 195 of the upcoming passenger and/or navigation instructions to an updated pick-up location, such that an empty seat is curbside. In some examples, this updated pick-up location may be accepted or declined by the upcoming passenger. In variations, the updated pick-up location may be mandated by a selected transport service (e.g., a lower cost, express carpool service in which users 197 walk a certain distance for pick-ups and/or destinations to optimize global flow of the drivers 193 throughout a given region).

When an empty curbside seat is still not available for the pick-up location, then as a secondary priority, the routing engine 150 may determine whether an empty curbside seat may be achieved through routing. If so, the routing engine 150 can route the transport vehicle 194 such that the upcoming passenger 197 enters the vehicle 194 from the curbside with an empty seat available adjacent to the upcoming passenger 197. However, if an empty curbside seat cannot be achieved through routing, then as a tertiary priority, the content generator 160 may transmit seat repositioning requests to the current carpool occupants of the vehicle 194 to make an empty curbside seat available for the upcoming pickup. For example, the content generator 160 can transmit a repositioning request to a current carpool passenger sitting in the right, rear seat of the vehicle 194, so that an upcoming passenger 197 may be picked up from the right side of a busy, two-way street.

In various examples, the rider positioning engine 140 can further coordinate with the routing engine 140 to take into account passenger drop-offs to further optimize the seating arrangement of the carpool passengers 197 within the vehicle 194. For example, if a current passenger 197 is being dropped off on a one-way street (e.g., the left side of a one-way street), then the rider positioning engine 140 can flag the passenger 197 as a candidate that can occupy either the left or the right rear seat of the transport vehicle 194. However, if a current passenger is being dropped off on the right side of a two-way street, the rider positioning engine 140 can lock the passenger to a right-side seat of the vehicle 194. For example, prior to pick-up, the content generator 160 can transmit a seat assignment to the user device 195 of the upcoming passenger 197 indicating the front left passenger seat as the assigned seat for this passenger 197. Accordingly, the rear seats may be left freed for carpool passengers that may have more changeable or variable pick-up and/or drop-off locations (e.g., for street corner pickups and drop-offs).

For autonomous vehicle 192 implementations, the front and rear seats of the AV 192 may be utilized. In further examples, the vehicle 194 (whether human-driven or AV 192) may include additional rows of seats that the rider positioning engine 140 can utilize to optimally position passengers 197 within the vehicle to ensure minimal in-vehicle shuffling and avoiding scenarios in which the upcoming passenger 197 must enter the vehicle from the street side, and where a next drop-off passenger must exit the vehicle from the street side. Accordingly, the routing engine 150, rider positioning engine 140, content generator 160, and matching engine 130 can coordinate the upcoming passenger 197, the routing of the transport vehicle 194, the routing of the upcoming passenger 197, and the positions of the passengers within the vehicle 194 to ensure that only curbside pick-ups and drop-offs are performed.

The content generator 160 can transmit displayable content that indicates or highlights the assigned seat or the requested repositioning seat to the current and upcoming passengers of the vehicle 194. In variations, the content generator 160 can transmit notifications, such as text messages or emails to the upcoming passenger 197 and/or current passengers of the carpool vehicle 194.

Uncoordinated or marginally coordinated pick-ups and drop-offs utilized by some transport service providers can result in dangerous situations involving riders rushing across busy streets or intersections in order to enter awaiting vehicles. Thus, a technical problem exists in the lack of intelligent coordination between matching, routing, rider positioning, and rider repositioning in current transport services. The example network computing system 100 described herein offers a technical solution to this problem by providing intelligent, computer network-driven coordination to ensure both increased pick-up and drop-off efficiencies and increased safety for carpool passengers 197.

Computing Device

Figure 2:
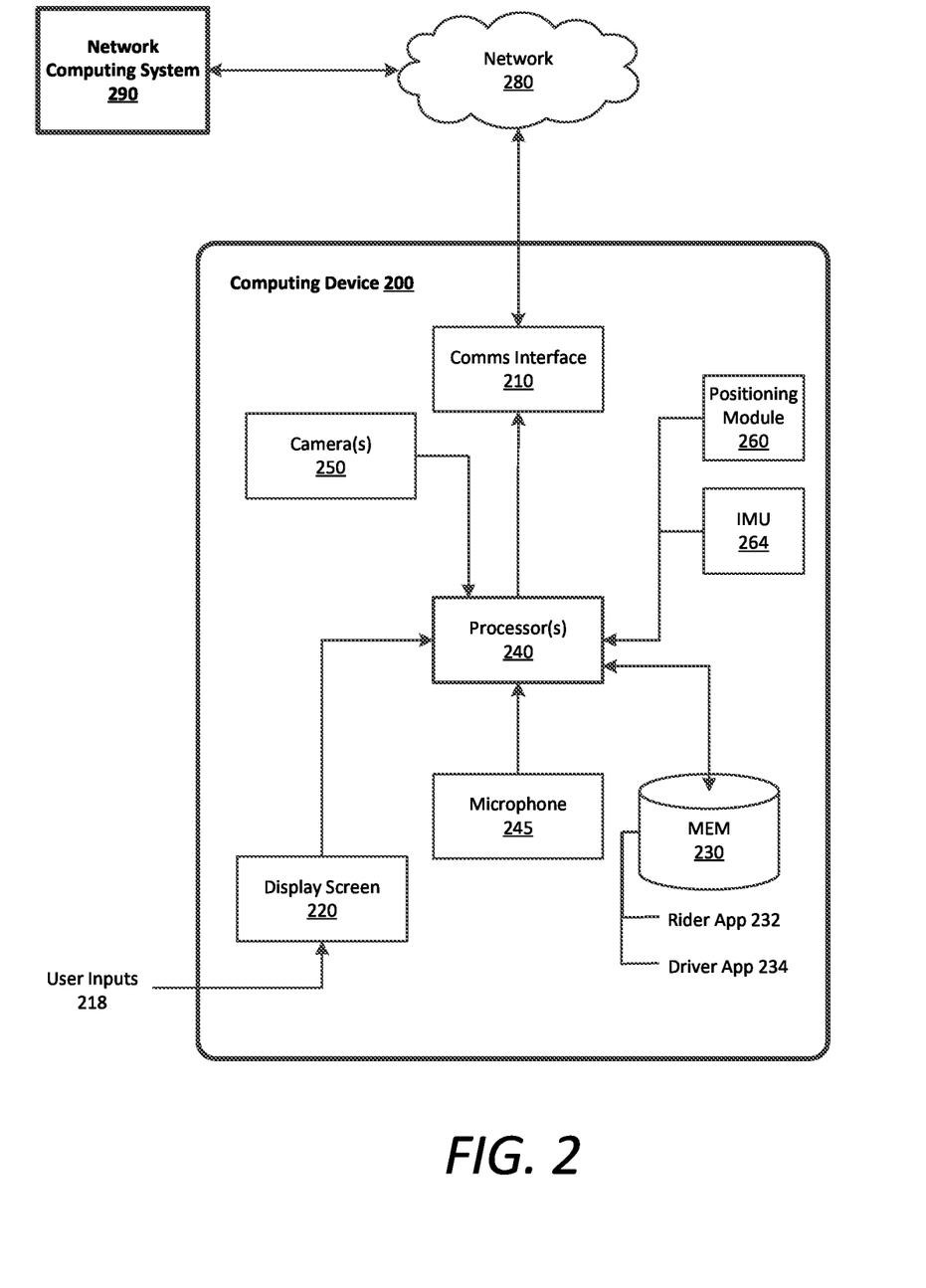
FIG. 2 is a block diagram illustrating an example user or driver device executing and operating a designated transport application for communicating with a network transport service, according to examples described herein.

FIG. 2 is a block diagram illustrating an example computing device of a user or driver executing a designated transport service application for communicating with a network transport service, according to examples described herein. In many implementations, the computing device 200 can comprise a mobile computing device, such as a smartphone, tablet computer, laptop computer, VR or AR headset device, and the like, and can be controlled by either a human driver 193 or a requesting user 197 described with respect to FIG. 1. The computing device 200 can include typical telephony features such as a microphone 245, one or more cameras 250 (e.g., a forward-facing camera and a rearward-facing camera), and a communication interface 210 to communicate with external entities using any number of wireless communication protocols. The computing device 200 can further include a positioning module 260 and an inertial measurement unit 264 that includes one or more accelerometers, gyroscopes, or magnetometers. In certain aspects, the computing device 200 can store a designated application (e.g., a rider app 232) in a local memory 230. In the context of FIG. 1, the rider app 232 can comprise the rider app 196 executable on the user device 195. In variations, the memory 230 can store additional applications executable by one or more processors 240 of the user device 200, enabling access and interaction with one or more host servers over one or more networks 280.

In response to a user input 218, the rider app 232 can be executed by a processor 240, which can cause an app interface to be generated on a display screen 220 of the computing device 200. The app interface can enable the user to, for example, configure an on-demand transport request, or display turn-by-turn map or walking directions (e.g., based on route data transmitted by the network computing system 290). In various implementations, the app interface can further enable the user to enter or select a destination location (e.g., by entering an address, performing a search, or selecting on an interactive map). The user can generate the transport request via user inputs 218 provided on the app interface. For example, the user can input a destination and select a transport service option to configure the transport request, and select a request feature that causes the communication interface 210 to transmit the transport request to the network computing system 290 over the one or more networks 280.

As provided herein, the rider application 232 can further enable a communication link with a network computing system 290 over the network(s) 280, such as the computing system 100 as shown and described with respect to FIG. 1. The processor 240 can generate user interface features (e.g., map, request status, etc.) using content data received from the network computing system 290 over the network(s) 280.

The processor 240 can transmit the transport requests via a communications interface 210 to the backend network computing system 290 over the network 280. In response, the computing device 200 can receive a confirmation from the network system 290 indicating the selected driver that will service the request. In various examples, the computing device 200 can further include a positioning module 260, which can provide location data indicating the current location of the requesting user to the network system 290 to, for example, determine the rendezvous location.

In certain examples, while the rider application 232 is executing, the processor 240 can receive sensor data requests and/or image capture requests from the network computing system 290, and/or transmit image data or sensor data to the network computing system 290 to enable the system 290 to determine whether individual seats within a vehicle are occupied. As provided herein, the sensor data can comprise any combination of image data from the camera 250, audio data from the microphone 245, IMU data (e.g., accelerometer, gyroscopic, and/or magnetometer data) from the IMU 264, and/or positioning data from the positioning module 260.

In various aspects, the network computing system 290 can transmit a seat assignment or repositioning request to the computing device 200 via the executing service application 232. The processor 240 can cause content to be displayed on the display screen 220 indicating the seat assignment or repositioning request. Additional notification alert signals can be executed, such as visual, haptic, and/or alerts to notify the passenger of the seat assignment or repositioning request. In certain aspects, the network computing system 290 can monitor the sensor data from the computing device 200 to determine whether the user has complied with the repositioning request.

For drivers, the computing device 200 can execute a designated driver application 234 that enables the driver to input an on-duty or available status. In some examples, the driver app 234 can further enable the driver to select one or multiple types of transport service options to provide to requesting users, such as a standard on-demand rideshare option, a carpool option, or an express carpool option in which requesting users must walk or travel a certain distance to an optimized pick-up location in exchange for a lower ride cost. For the latter option, the computing system 290 can select a pick-up location based on the current seating arrangement of a vehicle en route to rendezvous with the requesting user, as described herein.

In various examples, the driver application 234 and/or signals from the network computing system 290 can trigger the camera 250 to capture an image of the passenger interior of the driver's vehicle at specific triggering instances. In one example, the driver may have multiple mounting locations for the computing device 200 in the driver's vehicle, such as a driver's side location and a central location would provide the network computing system 290 with a better field of view of the passenger interior. When the driver selects the carpool or express carpool option, and the network computing system 290 detects, from an initial image, that the computing device 200 is mounted on the driver's side location, the network computing system 290 can transmit a request to remount the computing device 200 in the central location. For example, a user interface of the driver application 234 can present content on the display screen 220 requesting that the driver change the mounting location.

According to examples described herein, the driver application 234 and/or the network computing system 290 can trigger the camera 250 of the computing device 200 to capture an image of the passenger interior of the vehicle at the specified instances described herein. These instances can include an initial image when the driver selects a specified transport option for a transport session (e.g., selecting carpool or express carpool service options). Based on this initial image, the computing system 290 can perform an initial calibration to, for example, identify the number of seats in the driver's vehicle, any seats that may be blocked from the field of view of the camera 250, and the mount point of the computing device 200.

Thereafter, the camera 250 may be triggered to capture updated images as described herein. For example, whenever the driver accepts a new match, the driver may provide a user input 218 on the display screen 220, which can trigger navigation content to be displayed on the display screen 220. The navigation content can provide the driver with turn-by-turn directions along an optimized route to the next pick-up or drop-off location. In some aspects, the driver acceptance selection can also cause the camera to capture an updated image, which can provide the network computing system 290 with the current seating arrangement and cause the computing system 290 to alter or update the route and navigation instructions for the vehicle and/or walking directions for an upcoming passenger.

In various implementations, the driver can provide the user interface with an input 218 whenever a passenger is dropped off or picked up. Each of these inputs can trigger the camera 250 to capture an updated image, and transmit the image data corresponding to the updated image to the network computing system 290 accordingly. As provided herein, the updated image can indicate the current seating arrangement of passengers within the vehicle, and cause the network computing system 290 to configure the route(s) of the vehicle and/or upcoming passenger, and/or transmit a request through the rider application 232 of a current passenger to change seats, in order to ensure an available, curbside empty seat for an upcoming pick-up.

Methodology

Figure 3:
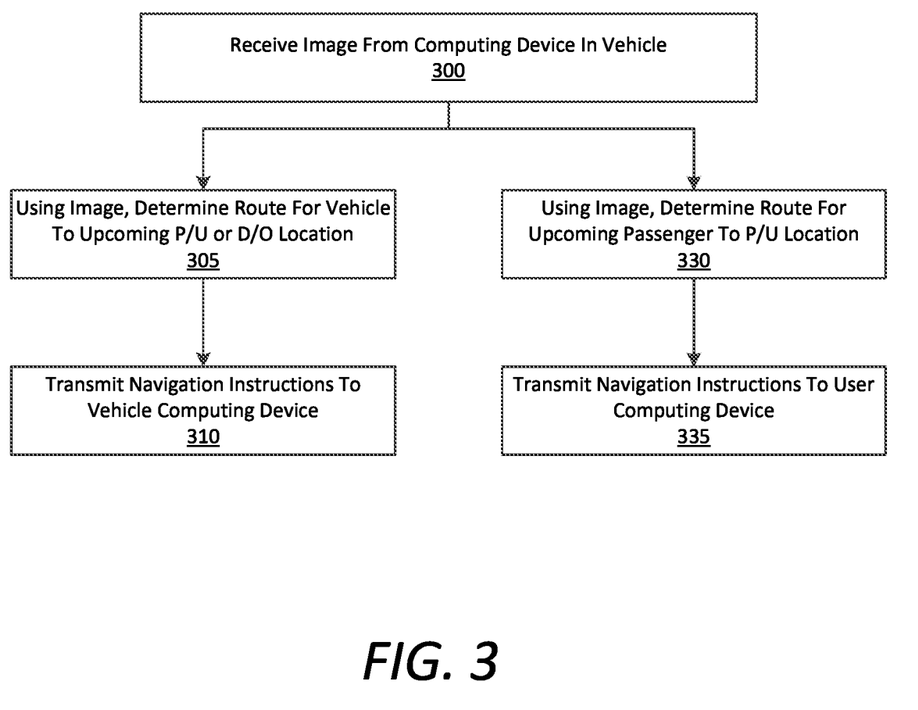
FIG. 3 is a flow chart describing a process of remotely tracking seat arrangement for transport coordination and navigation, according to examples described herein.
Figure 4:
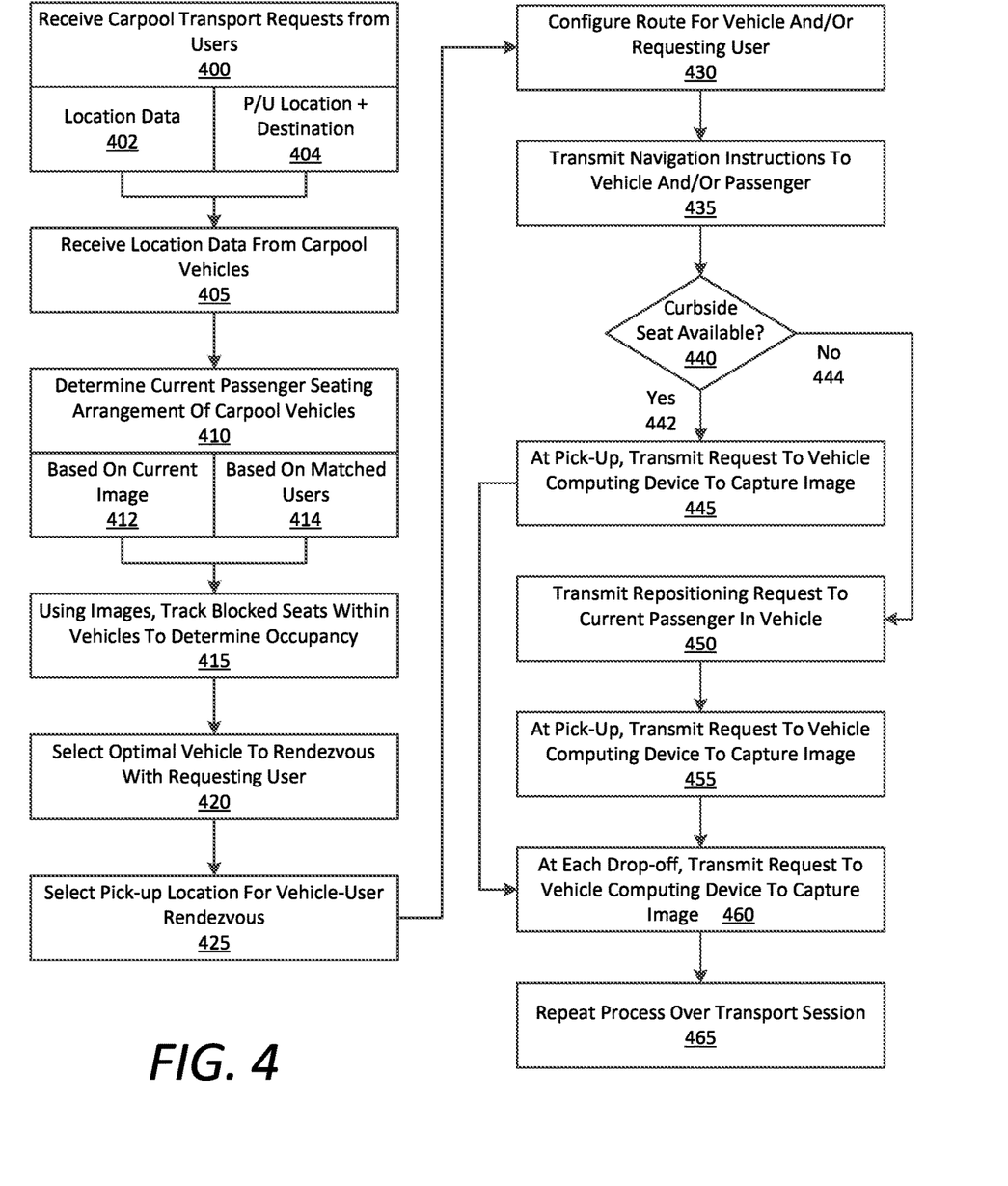
FIG. 4 is a flow chart describing another process of remotely tracking seat arrangement for transport coordination and navigation.

FIGS. 3 and 4 are a flow charts describing processes of remotely tracking seat arrangement for transport coordination and navigation, according to examples described herein. In the below descriptions of FIGS. 3 and 4, reference may be made to reference characters representing like features as shown and described with respect to FIGS. 1 and 2. Furthermore, the processes described in connection with FIGS. 3 and 4 may be performed by an example network computing system 100, 290 as shown and described with respect to FIGS. 1 and 2, or a combination of the network computing system 100, 290 and driver application 191, 234 executing on the computing devices 190, 200 of drivers. Referring to FIG. 3, the computing system 100 can receive image data corresponding to an image of the passenger interior of a vehicle from the computing device 190 of the driver or the vehicle itself (300). In various implementations, the computing system 100 can remotely coordinate a carpool transport service between available drivers 193 and requesting users 197. In processing the image data, the computing system 100 can configure the routes of the vehicle 194 and/or an upcoming passenger 197 to optimize an upcoming pick-up.

For the vehicle 194, the computing system 100 use the image to determine a route for the vehicle to an upcoming pick-up location or drop-off location (305), and transmit navigation instructions to the computing device 190 of the driver 193 or the vehicle 194 (310). For the upcoming passenger 197, the computing system 100 can use the image to determine a route for the upcoming passenger 197 to a pick-up location (330), and transmit navigation instructions (e.g., walking directions) to the computing device 195 of the upcoming passenger 197 (335). The selected pick-up location and navigation instructions for the vehicle 194 and the passenger 197 can be configured such that the upcoming passenger 197 does not need to cross a street or enter the vehicle 194 street-side when the vehicle 194 arrives at the pick-up location.

FIG. 4 is a lower level flow chart describing an example process of remotely tracking seat arrangement for transport coordination and navigation, according to examples described herein. The steps described in connection to FIG. 4 need not be implemented in any particular order, and any step referred to in FIG. 4 may be performed prior to, in conjunction with, or after any other step described. Referring to FIG. 4, the computing system 100 can receive carpool transport requests from requesting users 197 throughout a given region (400). In certain implementations, each transport request can include location data indicating a current location of the user 197 (402), and/or a requested pick-up location and/or destination (404). The computing system 100 can further receive location data from carpool vehicles 194 operating throughout the given region (405). The computing system 100 can further determine the current passenger seating arrangement of each of the carpool vehicles 194 (410). For example, at certain triggering instances, the computing device 190 of the driver 193 or vehicle 194 can transmit image data of the passenger interior of the vehicle 194, which the computing system 100 can utilize to determine the current seating arrangement (412). In certain examples, the computing system 100 can further infer the seating arrangement based on the matched users 197 of the vehicles 194, which can indicate the current number of passengers 197 the vehicle 194 currently carries (414).

According to examples described herein, the computing system 100 can track blocked seats within each of the candidate carpool vehicles 194 to determine the occupancy and seating arrangement of passengers within those vehicles 194 using the images and/or match information (415). The computing system 100 may then select an optimal vehicle 194 to rendezvous with the requesting user 197 (420). In certain examples, the computing system 100 can select the optimal vehicle based on a variety of factors, such as distance or time from the user's current location, an inputted pick-up location, the current occupancy of the vehicle 194, the available seats and their locations, and the like.

The computing system 100 can select a pick-up location for the vehicle 194 and user 197 (425). The computing system 100 can further configure the route for the vehicle 194 and/or the requesting user 197 to the pick-up location (430), and transmit navigation instructions to the driver 193 and/or requesting user 197 for traveling to the pick-up location (435). According to examples, the computing system 100 can select the pick-up location and/or the routes to ensure that the user 197 enters the vehicle from the curbside, and to further ensure that a curbside seat is available. However, in certain circumstances, such as when the rear street-side seat is the only unoccupied seat, the computing system 100 may require repositioning of current passengers within the vehicle 194.

Accordingly, the computing system 100 can determine whether a curbside seat is available given the current route (s) by the vehicle 194 and/or requesting user 197, and the pick-up location (440). If so (442), then the computing system 100 can allow the pick-up to occur, and then send a request to the computing device 190 of the vehicle 194 or driver 193 to capture and transmit image data corresponding to an updated image during or after the pick-up occurs (445). However, if a curbside seat is not available (444), then the computing system 100 can transmit a repositioning request to a current passenger within the vehicle 194—prior to arriving at the pick-up location—to change seats (450). When the pick-up occurs, the computing system 100 can send a request to the computing device 190 of the vehicle 194 or driver 193 to capture an updated image and transmit image data of the updated image during or after the pick-up occurs (455). Still further, after every drop-off, the computing system can also transmit a request to the computing device 190 of the vehicle or driver 193 to capture and transmit an updated image, which the computing system 100 can utilized to make additional matches, route the vehicle 194 and or upcoming passengers 197, configure pick-up locations, and the like (460). The process may then repeat over an entire transport session by the driver 193 or vehicle 194 (465).

Hardware Diagram

Figure 5:
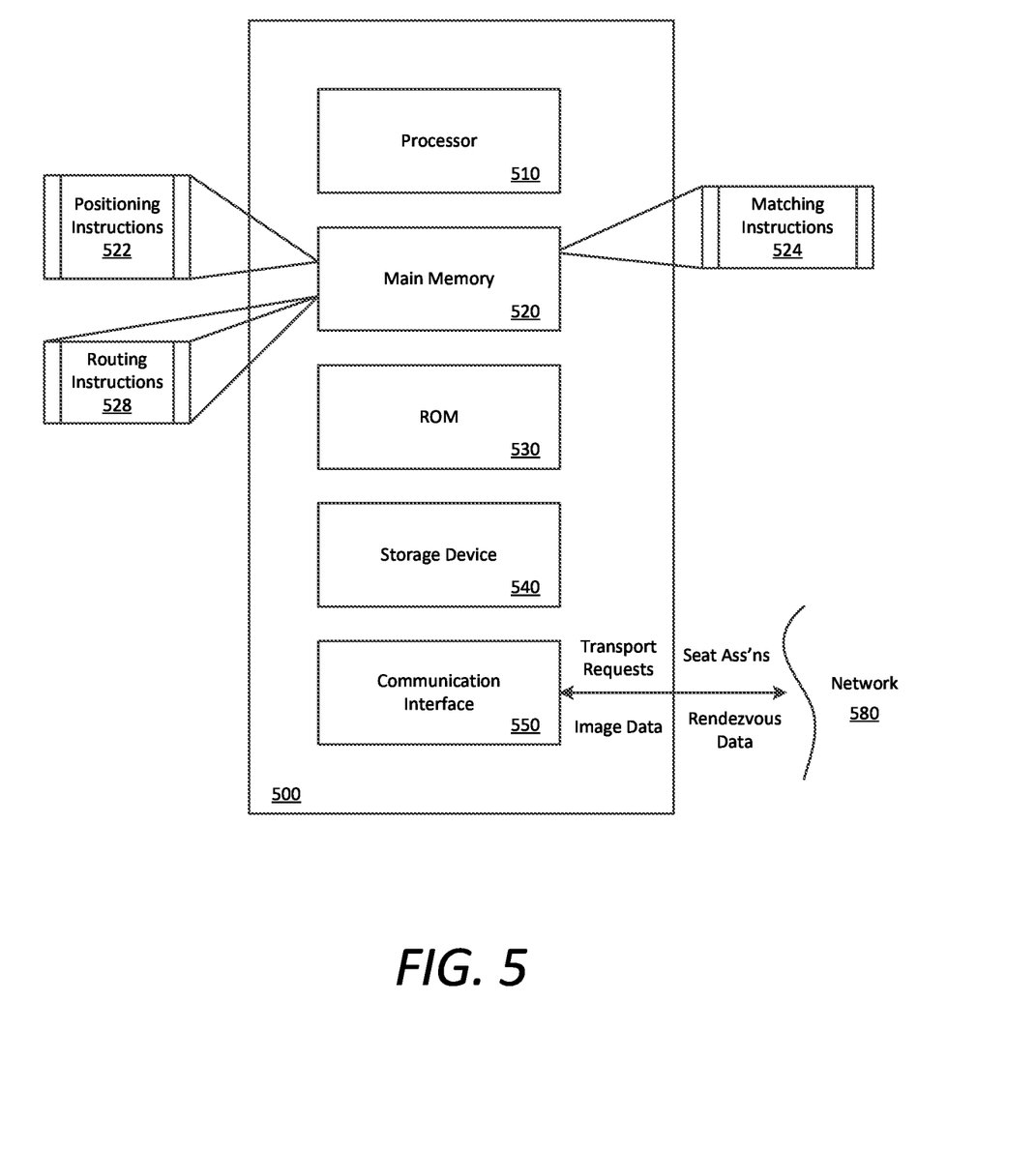
FIG. 5 is a block diagram that illustrates a computing system upon which examples described herein may be implemented.

FIG. 5 is a block diagram that illustrates a computing system upon which examples described herein may be implemented. A computing system 500 can be implemented on, for example, a server or combination of servers. For example, the computing system 500 may be implemented as part of an on-demand transport service, such as described in FIGS. 1 and 2. In the context of FIG. 1, the network computing system 100 may be implemented using a computing system 500 such as described by FIG. 5. The network computing system 100 may also be implemented using a combination of multiple computing systems as described in connection with FIG. 5.

In one implementation, the computing system 500 includes processing resources 510, a main memory 520, a read-only memory (ROM) 530, a storage device 540, and a communication interface 550. The computing system 500 includes at least one processor 510 for processing information stored in the main memory 520, such as provided by a random-access memory (RAM) or other dynamic storage device, for storing information and instructions which are executable by the processor 510. The main memory 520 also may be used for storing temporary variables or other intermediate information during execution of instructions to be executed by the processor 510. The computing system 500 may also include the ROM 530 or other static storage device for storing static information and instructions for the processor 510. A storage device 540, such as a magnetic disk or optical disk, is provided for storing information and instructions.

The communication interface 550 enables the computing system 500 to communicate with one or more networks 580 (e.g., cellular network) through use of the network link (wireless or wired). Using the network link, the computing system 500 can communicate with one or more computing devices, one or more servers, one or more databases, and/or one or more self-driving vehicles. In accordance with examples, the computing system 500 receives transport requests from mobile computing devices of individual users. The executable instructions stored in the memory 530 can include matching instructions 524, which the processor 510 executes to match a requesting user with a driver or vehicle, as described herein.

The executable instructions stored in the memory 520 can also include routing instructions 528 and rider positioning instructions 522. The processor 510 can execute the routing instructions 528 to optimally route the transport vehicle and/or requesting user such that a next passenger is picked up on the curbside, where an empty seat is available upon the user's entry into the vehicle. The process can further execute the rider positioning instructions 522 to process image and/or sensor data from the computing devices of the driver, passengers, and/or AV sensors to track or determine the positions of the passengers within the vehicle. In certain examples, the processor 510 can further execute the rider positioning instructions 522 to transmit repositioning requests to select passengers in coordination with the routing instructions, and to transmit seat assignments and rendezvous data to upcoming passengers.

Examples described herein relate to the use of the computing system 500 for implementing the techniques described herein. According to one example, those techniques are performed by the computing system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system, comprising:
a network communication interface to communicate, over one or more networks, with computing devices;
one or more processors; and
a memory storing instructions that, when executed by the one or more processors, causes the computing system to:
receive, over the one or more networks, image data from a computing device of a vehicle or a driver, the image data corresponding to an image of a passenger interior of the vehicle that indicates a seating arrangement of one or more current passengers of the vehicle;
using the image data, determine (i) a first route for the vehicle or the driver to travel to a start location of a requesting user, and (ii) a second route for the requesting user to travel to the start location; and
transmit, over the one or more networks, (i) first navigation instructions to the computing device of the vehicle or the driver, the first navigation instructions causing a map interface displayed on the computing device of the vehicle or the driver to display routing directions corresponding to the first route, and (ii) second navigation instructions to a computing device of the requesting user to facilitate a rendezvous between the vehicle and the requesting user, the second navigation instructions causing a map interface displayed on the computing device of the requesting user to display directions corresponding to the second route;
wherein the executed instructions cause the computing system to determine the first route to cause the vehicle to arrive at the start location such that a curbside seat of the vehicle is available for the requesting user.

2. The computing system of claim 1, wherein the executed instructions further cause the computing system to:
receive inertial measurement unit (IMU) data from one or more computing devices associated with the vehicle;
wherein the executed instructions cause the computing system to further determine the seating arrangement of the one or more passengers of the vehicle using the IMU data.

3. The computing system of claim 2, wherein the executed instructions cause the computing system to execute edge detection processing on the image data to determine the seating arrangement of the one or more current passengers of the vehicle.

4. The computing system of claim 1, wherein the executed instructions cause the computing system to determine the second route for the requesting user such that the curbside seat of the vehicle is available when the vehicle arrives at the start location.

5. The computing system of claim 1, wherein the map interface displayed on the computing device of the requesting user is generated via a user interface of a service application of a rideshare service, the service application executing on a computing device of the requesting user.

6. The computing system of claim 5, wherein the executed instructions further cause the computing system to:
provide, via the user interface of the service application, a user interface element indicating an assigned seat for the requesting user in the vehicle.

7. The computing system of claim 1, wherein the executed instructions further cause the computing system to:
detect, over the one or more networks, a mode selection by the driver on the computing device of the driver, the mode selection indicating a passenger drop-off;
based on the mode selection, receive, over the one or more networks, image data corresponding to an updated image of the passenger interior of the vehicle from the computing device of the vehicle or the driver, the updated image indicating an updated seating arrangement of one or more current passengers of the vehicle.

8. The computing system of claim 7, wherein the executed instructions further cause the computing system to:
based on the image data corresponding to the updated image of the passenger interior of the vehicle, determine an updated route for the vehicle to an upcoming drop-off location of a next passenger of the one or more current passengers.

9. The computing system of claim 8, wherein the executed instructions cause the computing system to determine the updated route to the upcoming drop-off location such that a seat occupied by the next passenger is curbside at the upcoming drop-off location.

10. The computing system of claim 1, wherein the executed instructions further cause the computing system to:
determine, based on a field of view corresponding to the image, that a seat within the passenger interior is not included in the field of view.

11. The computing system of claim 10, wherein the executed instructions further cause the computing system to:
periodically determine, based on a set of inference criteria, whether the seat is occupied.

12. The computing system of claim 11, wherein the set of inference criteria comprises a current number of passengers within the vehicle.

13. A non-transitory computer-readable medium storing instructions that, when executed by one or more processors, cause the one or more processors to:
receive, over one or more networks, image data from a computing device of a vehicle or a driver, the image data corresponding to an image of a passenger interior of the vehicle that indicates a seating arrangement of one or more current passengers of the vehicle;
using the image data, determine (i) a first route for the vehicle or the driver to travel to a start location of a requesting user, and (ii) a second route for the requesting user to travel to the start location; and
transmit, over the one or more networks, (i) first navigation instructions to the computing device of the vehicle or the driver, the first navigation instructions causing a map interface displayed on the computing device of the vehicle or the driver to display routing directions corresponding to the first route, and (ii) second navigation instructions to a computing device of the requesting user to facilitate a rendezvous between the vehicle and the requesting user, the second navigation instructions causing a map interface displayed on the computing device of the requesting user to display directions corresponding to the second route;
wherein the executed instructions cause the computing system to determine the first route to cause the vehicle to arrive at the start location such that a curbside seat of the vehicle is available for the requesting user.

14. The non-transitory computer-readable medium of claim 13, wherein the executed instructions further cause the computing system to:
receive inertial measurement unit (IMU) data from one or more computing devices associated with the vehicle;

wherein the executed instructions cause the computing system to further determine the seating arrangement of the one or more passengers of the vehicle using the IMU data.

15. The non-transitory computer-readable medium of claim 13, wherein the executed instructions cause the computing system to determine the second route for the requesting user such that the curbside seat of the vehicle is available when the vehicle arrives at the start location.

16. The non-transitory computer-readable medium of claim 13, wherein the map interface displayed on the computing device of the requesting user is generated via a user interface of a service application of a rideshare service, the service application executing on a computing device of the requesting user.

17. The non-transitory computer-readable medium of claim 16, wherein the executed instructions further cause the computing system to:
provide, via the user interface of the service application, a user interface element indicating an assigned seat for the requesting user in the vehicle.

18. A computer-implemented method of coordinating transport, the method being performed by one or more processors and comprising:
receiving, over one or more networks, image data from a computing device of a vehicle or a driver, the image data corresponding to an image of a passenger interior of the vehicle that indicates a seating arrangement of one or more current passengers of the vehicle;
using the image data, determining of (i) a first route for the vehicle or the driver to travel to a start location of a requesting user, and (ii) a second route for the requesting user to travel to the start location; and
transmitting, over the one or more networks, (i) first navigation instructions to the computing device of the vehicle or the driver, the first navigation instructions causing a map interface displayed on the computing device of the vehicle or the driver to display routing directions corresponding to the first route, and (ii) second navigation instructions to a computing device of the requesting user to facilitate a rendezvous between the vehicle and the requesting user, the second navigation instructions causing a map interface displayed on the computing device of the requesting user to display directions corresponding to the second route;
wherein the executed instructions cause the computing system to determine the first route to cause the vehicle to arrive at the start location such that a curbside seat of the vehicle is available for the requesting user.

* * * * *

UNITED STATES PATENT AND TRADEMARK OFFICE
CERTIFICATE OF CORRECTION

PATENT NO. : 11,047,700 B2
APPLICATION NO. : 16/265026
DATED : June 29, 2021
INVENTOR(S) : Andrew Martin Warr Page 1 of 2

It is certified that error appears in the above-identified patent and that said Letters Patent is hereby corrected as shown below:

In the Claims

At Column 18 Lines 35-62, should read:
13. A non-transitory computer-readable medium storing instructions that, when executed by one or more processors of a computing system, cause the one or more processors to: receive, over one or more networks, image data from a computing device of a vehicle or a driver, the image data corresponding to an image of a passenger interior of the vehicle that indicates a seating arrangement of one or more current passengers of the vehicle; using the image data, determine (i) a first route for the vehicle or the driver to travel to a start location of a requesting user, and (ii) a second route for the requesting user to travel to the start location; and transmit, over the one or more networks, (i) first navigation instructions to the computing device of the vehicle or the driver, the first navigation instructions causing a map interface displayed on the computing device of the vehicle or the driver to display routing directions corresponding to the first route, and (ii) second navigation instructions to a computing device of the requesting user to facilitate a rendezvous between the vehicle and the requesting user, the second navigation instructions causing a map interface displayed on the computing device of the requesting user to display directions corresponding to the second route; wherein the executed instructions cause the computing system to determine the first route to cause the vehicle to arrive at the start location such that a curbside seat of the vehicle is available for the requesting user.

At Column 19 Lines 21- Column 20, Lines 1-23, should read:
18. A computer-implemented method of coordinating transport, the method being performed by one or more processors and comprising: receiving, over one or more networks, image data from a computing device of a vehicle or a driver, the image data corresponding to an image of a passenger interior of the vehicle that indicates a seating arrangement of one or more current passengers of the vehicle; using the image data, determining of (i) a first route for the vehicle or the driver to travel to a start location of a requesting user, and (ii) a second route for the requesting user to travel to the start location; and transmitting, over the one or more networks, (i) first navigation instructions to the computing device of the vehicle or the driver, the first navigation instructions causing a map interface displayed on the Signed and Sealed this
Thirty-first Day of August, 2021

Drew Hirshfeld
*Performing the Functions and Duties of the
Under Secretary of Commerce for Intellectual Property and
Director of the United States Patent and Trademark Office* computing device of the vehicle or the driver to display routing directions corresponding to the first route, and (ii) second navigation instructions to a computing device of the
requesting user to facilitate a rendezvous between the vehicle and the requesting user, the second navigation instructions causing a map interface displayed on the computing device of the requesting user to display directions corresponding to the second route; wherein the one or more processors determine the first route to cause the vehicle to arrive at the start location such that a curbside seat of the vehicle is available for the requesting user.